March 16, 1954
J. ENSINK
CIRCUIT-ARRANGEMENT FOR PROTECTING AMPLIFIERS FROM OVERLOAD
Filed Oct. 9, 1951
2,672,530
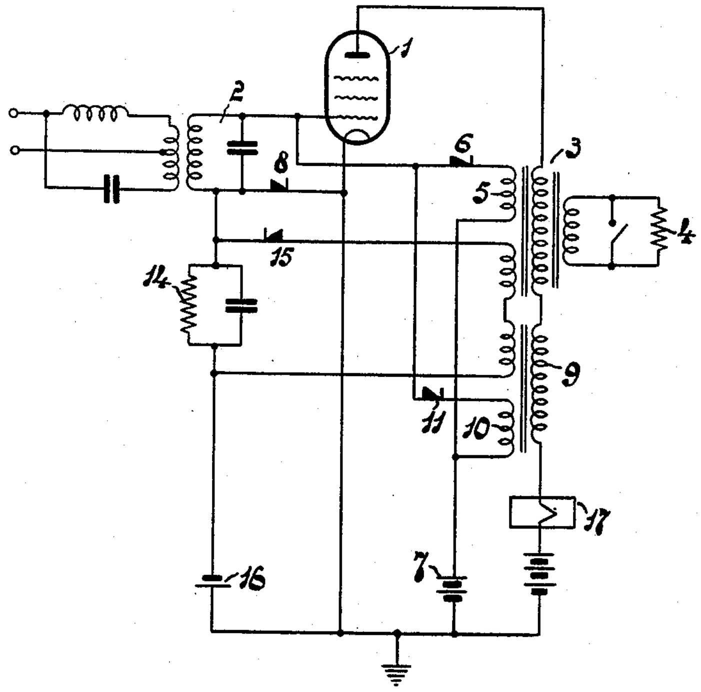
INVENTOR
Johannes Ensink
By [signature]
Agent Patented Mar. 16, 1954

2,672,530

UNITED STATES PATENT OFFICE 2,672,530

CIRCUIT-ARRANGEMENT FOR PROTECTING AMPLIFIERS FROM OVERLOAD

Johannes Ensink, Hilversum, Netherlands, assignor to Hartford National Bank and Trust Company, Hartford, Conn., as trustee Application October 9, 1951, Serial No. 250,468

Claims priority, application Netherlands October 13, 1950

2 Claims. (Cl. 179—171)

The invention relates to circuit-arrangements for protecting amplifiers, more particularly carrier-wave amplifiers, from being overloaded.

An amplifier for the amplification of a carrier-wave oscillation is frequently required to have a constant output voltage. For this purpose a negative feedback voltage which is proportional to the output voltage is supplied through a rectifier having a threshold voltage to the input circuit of the amplifier so that, if this negative feedback voltage exceeds the threshold voltage, a substantial negative feedback preventing a further increase in output voltage becomes operative across the input circuit.

Under certain conditions it may occur that the output impedance of the amplifier is short-circuited or is at least considerably lower than that permissible for the amplifier. The normally short-circuited output circuit of a spare amplifier is, for example, connected in series with that of a main amplifier; this short-circuit being removed only when the main amplifier breaks down. Consequently, the shortcircuited amplifier will be overloaded, which might materially shorten its lifetime.

In order to avoid this overload, in accordance with the invention, provision is made of two negative feedback circuits, each comprising a rectifier having a threshold voltage, of which the first, when the threshold voltage is exceeded, feeds back to the input circuit of the amplifier a negative feedback voltage which is proportional to the output voltage, the second, on the contrary, a negative feedback voltage which is proportional to the output current, the ratio between the negative feedback voltage and the threshold voltage of the second negative feedback circuit then exceeding that of the first negative feedback circuit, when the permissible load of the amplifier is exceeded.

In order that the invention may be more clearly understood and readily carried into effect, it will now be described more fully with reference to the accompanying drawing.

Referring to the figure of the drawing, reference numeral 1 designates an amplifying tube for the amplification of carrier-wave oscillations which are supplied through an input circuit 2 to the grid of the tube 1. The output circuit of the tube 1 comprises an output transformer 3, which supplies a voltage to a load impedance 4. In order to stabilize the output voltage across the transformer 3, the voltage produced across a secondary winding 5 is supplied through a rectifier 6 having a threshold voltage source 7 to the input circuit 2, so that, if the voltage across the winding 5 exceeds the threshold voltage of the source 7, the input circuit 2 has supplied to it a negative feedback voltage which counteracts a further increase in output voltage. In this case the lower end of the circuit 2 is connected by way of the normally conductive rectifier 8 to a point of constant potential.

If the impedance 4 should assume an excessively low value, for example, if it were short-circuited, the amplifying tube 1 would be in danger of being overloaded, since then the negative feedback voltage, which had to be supplied through the rectifier 6 and the threshold voltage source 7 to the input circuit 2 is not developed. In order to avoid this overload, in accordance with the invention, a transformer 9 is connected in series with the transformer 3, this transformer 9 being traversed by the anode current of the amplifying tube 1, the voltage across the secondary winding 10 being supplied also through a rectifier 11 and the threshold voltage source 7 to the input circuit 2 of the amplifying tube 1. The transformer ratios of the transformers 3 and 9 are chosen to be such that, if the permissible load of the tube 1 is exceeded owing to an excessively low value of the impedance 4, the voltage across the winding 10 exceeds that across the winding 5. Consequently, even before the negative voltage feedback across the rectifier 6 becomes operative, if the permissible load is exceeded, the current feedback across the rectifier 11 will become operative, so that a further increase in current passing through the amplifying tube 1 is counteracted, irrespective of the voltage produced across the load impedance 4.

If desired, two separate threshold voltage sources may be provided, of which one is only operative across the circuit of the rectifier 6, the other across that of the rectifier 11. In this case, if the permissible load is exceeded, the ratio between the voltage across the winding 10 and the threshold voltage across the circuit of the rectifier 11 is, consequently, required to exceed that between the voltage across the winding 5 and the threshold voltage across the circuit of the rectifier 6.

The amplifier hitherto described is, for example, used as a spare amplifier in a carrier-wave telephone system, in which the normally short-circuited output circuit is connected in series with that of a main amplifier. In order to afford an indication of whether this spare amplifier itself is in good order, provision is made of the circuit elements 8, 14, 15, 16 and 17. If the tube 1 operates correctly, a positive voltage will be produced across a filter 14 included in the grid circuit of this tube by means of a rectifier 15, this voltage neutralizing the voltage of a negative bias voltage source 16, the grid bias voltage, however, not being adapted to exceed the potential of the right-hand electrode of the rectifier 8. However, if across the anode circuit of the tube 1 neither a sufficient alternating voltage nor a sufficient alternating current is produced, the voltage across the filter 14 drops and hence the grid voltage of the tube 1, so that an alarm relay 17 included in the anode circuit of this tube becomes operative.

What I claim is:

1. Protective apparatus for preventing overloading of an amplifier having a signal input circuit and output circuit coupled to a load comprising first and second negative feedback networks coupled to said output circuit, each network including a rectifier and a threshold voltage source therefor, said first feedback network being coupled to the input circuit to apply thereto when the threshold is exceeded a negative feedback voltage proportional to the voltage developed in said output circuit, the second network being coupled to the input circuit to apply thereto when its threshold is exceeded a negative feedback voltage proportional to the current produced in said output circuit, the ratio of the negative feedback voltage to the threshold voltage of the second network being greater than that of said first network when the permissible load on the amplifier is exceeded.

2. Protective apparatus for preventing overloading of a spare carrier wave amplifier having a signal input circuit and an output circuit connected in series with the output terminals of a main amplifier, the output circuit being normally short-circuited when the main amplifier is operative, said protective apparatus comprising first and second negative feedback networks coupled to said output circuit, each network including a rectifier and a threshold voltage source therefor, said first feedback network being coupled to the input circuit to apply thereto when the threshold is exceeded a negative feedback voltage proportional to the voltage developed in said output circuit, the second network being coupled to the input circuit to apply thereto when its threshold is exceeded a negative feedback voltage proportional to the current produced in said output circuit, the ratio of the negative feedback voltage to the threshold voltage of the second network being greater than that of said first network when the permissible load on the amplifier is exceeded.

JOHANNES ENSINK.

References Cited in the file of this patent

UNITED STATES PATENTS

| Number | Name | Date |
|---|---|---|
| 2,318,061 | Dailey | May 4, 1943 |
| 2,561,049 | Buys et al. | July 17, 1951 |